Patented Dec. 2, 1952

2,620,295

UNITED STATES PATENT OFFICE 2,620,295

RECOVERY OF GLYCEROL FROM FERMENTATION RESIDUES

Howard M. Hodge, Linthicum Heights, Md., assignor, by mesne assignments, to National Distillers Products Corporation, New York, N. Y., a corporation of Virginia No Drawing. Application December 23, 1950, Serial No. 202,578

10 Claims. (Cl. 202—56)

This invention relates to a method for the recovery of glycerol from concentrated glycerine-containing fermentation residues and especially residues of the type referred to in the industry as E. G. R. (evaporated glycerine residue).

Processes for the manufacture of glycerol by the fermentation of molasses, grain mashes, and the like, are well known. However, to my knowledge, the industry has not, heretofore, been able to produce glycerol by such processes at a price competitive with that of glycerol derived as a by-product in soap manufacture, due, in part at least, to difficulties encountered in economically recovering the glycerol from the fermentation residues. For example, when the residue resulting from the fermentation of molasses is distilled with steam under a vacuum, the mixture forms a thick tarry mass before 50% of the glycerol present in the residue has been recovered. Also, where attempts have been made to blow steam through the mixture, the solids present therein have caused the steam to channelize so that portions of the mass are inadequately heated, while other portions are locally overheated, as the distillation proceeds, so that decomposition of the glycerol occurs.

A recognized analytical laboratory procedure for determining the quantity of glycerol in concentrated fermentation residues is to absorb a known quantity of the residue on asbestos, then steam the resultant material while under a reduced pressure to drive off the glycerol and recovering and measuring the quantity of glycerol thus obtained. This laboratory procedure has been found satisfactory, as such, where very small quantities of the asbestos and of the residue are used, but is entirely unsuited for commercial sized operations. This is true not only because of the excessive cost of asbestos, but also it has been found that, when mixed with fermentation residues, the asbestos or asbestos fibers tend to felt or mat together to such an extent that the resultant mass is substantially impervious to steam, or else, where large scale mechanical mixing is used, large balls of the mixture are formed from which the economical recovery of glycerol by steaming appears to be impossible.

It has also been proposed to recover glycerol from a dehydrated wort from glycerine fermentation by mixing the anhydrous wort with a finely divided solid to form a pulverulent mass and extracting the glycerol from the mass by solvent extraction. To my knowledge, such proposal has not been found practical by the industry.

In accordance with my present invention, a glycerol-containing fermentation residue which has been concentrated by evaporation of the major portion of the water therefrom is mixed with a relative coarse non-felting, fibrous absorbent material in such proportions that all of the residue added is taken up by, or adheres to, the fibrous material to form a fibrous cohering mass. This mass is then subjected to drying to remove at least the major portion of residual moisture which results in a fibrous, somewhat tacky, loosely cohering, highly permeable mass, and thereafter super-heated steam is passed through a bed of the material of substantial depth enclosed in a distilling chamber maintained at reduced pressure, whereby the entire mass is uniformly heated and the glycerol distilled therefrom. The mixed steam and glycerol vapors are withdrawn from the chamber and the glycerol separated from the steam, advantageously by partial condensation.

An essential feature of my process is the character of the bed of impregnated material subjected to the distillation. This is important since it is necessary to the economic recovery of the glycerol that the mass be uniformly heated throughout and that the glycerol vapors can readily escape therefrom. Further, commercial feasibility of the operation requires that the bed of impregnated material subjected to the distillation be of substantial depth, advantageously 1 to 3 feet, so that the heat of the steam is fully utilized, that the bed be uniformly permeable to the steam and that the mass be non-pulverulent so that channelling of the steam through the mass or the carrying over of solid particles with the effluent vapors and thus contaminating the distillate, is avoided.

To meet these requirements, I have found that the material constituting the bed should be of a relatively coarse, non-felted, fibrous structure, as previously noted.

In order to obtain a bed of the impregnated material having these required characteristics, the nature of the absorbent used is of primary importance. It is an essential of my present process that the solid absorbent material be of fibrous structure, and that the particles thereof, having random shape, shall possess sufficient mechanical resilience so that the particles when combined with the dehydrated residue, will not readily mat or felt together.

I have found crushed or coarsely ground peanut hulls to be most satisfactory for this purpose and especially peanut hulls which have been crushed and sized to pass through a 2 or 3 mesh screen and advantageously from which fines have been removed. I may, however, for this purpose, use other fibrous absorbent materials having the general characteristics just noted. I may, for instance, use coarse, fibrous peat moss substantially free from fines. Cottonseed hulls, shredded corn cobs, or rice hulls, may also be used for this purpose, though the latter is not particularly recommended because of its relatively low absorbency. Other relatively coarse, fibrous materials which form a springy mass and have pronounced mechanical resilience, may be used.

As a test of the suitability of various fibrous material for the purposes of my present invention, I have found generally that fibrous material which retains its mechanical resilience and does not readily mat or felt when wetted with water is generally useful. These materials may be characterized as sheddy and are so defined in the accompanying claims. It is likewise desirable, of course, that the fibrous material have a high capacity for absorbing the glycerol-containing residue.

The optimum proportion of residue to fibrous absorbent material to be used will vary somewhat with the absorptive properties of the particular solid used and also the character of the residue. It is generally desirable economically to place as large a proportion of the residue on the absorbent as is possible, so as to utilize equipment and handling cost to the fullest extent. However, from a practical aspect, it is important that there be no excess residue which might separate from the impregnated absorbent in the drying or steaming operation to form a pool of liquid in the bottom of the vessel which might solidify and present serious removal problems. Usually, proportions of evaporated residue equivalent to about 2 to 3 parts of the residue per part of the fibrous absorbent will satisfactorily be taken up by and adhere to the latter, and are particularly recommended. However, somewhat larger proportions have been used satisfactorily. Smaller proportions may likewise be used, but are generally less economical.

The mixing of the concentrated fermentation residue with the fibrous absorbent may be effected in a conventional type mixer, equipped with stirring mechanism. Advantageously, the absorbent is placed in the mixer and the residue run onto it during agitation. It is moreover helpful if the mixer used be of a type adapted for subsequent drying of the mixture.

When using residue, such as the so-called high test residues of relatively low viscosity, usually containing 18% to 24% glycerol, by weight, I have found it frequently advantageous to add the residue in increments with intermediate drying or partial drying of the mixture followed by a final drying step. However, when using a heavy viscous residue, such as the evaporated residue from black strap molasses, which usually contains 10% to 12% of glycerol, I have found it generally desirable to add all of the residue at one time.

It will be found that, by operating as herein described, the impregnated absorbent material, after the drying operation, will be a relatively dry, somewhat tacky, fibrous mass which is loosely cohering, relatively uniform throughout and highly permeable to steam and from which glycerol may be readily recovered, as herein described, to the extent of upwards of 90% of its glycerol content.

The invention will be illustrated by the following specific examples of the practical application thereof in commercial operation.

*Example I*

4400 pounds of evaporated, high test fermentation residue containing approximately 24% glycerine, was mixed with 1600 pounds of crushed peanut hulls and the mixture dried, under vacuum. This mixing and drying was carried out in stages—first, 3000 pounds of the evaporated residue being mixed with the crushed hulls by agitation in a vacuum drier of the rotary ribbon type, the drier closed, the pressure reduced to 2 to 3 inches of mercury and the drier externally heated by steam at a pressure of 25 pounds per square inch for a period of four hours. The drier was then opened and an additional 1000 pounds of the residue added and mixed with the material in the drier, the drier again closed, the pressure reduced, and the mass heated as before for a period of two hours. Then, a final increment of 400 pounds of the residue was added and mixed with the material in the drier and the drying of the resultant mixture continued for a period of about two hours, as just described.

By this procedure, about 4000 pounds of a permeable fibrous, somewhat tacky mass of the peanut hull-molasses residue mixture substantially free from water was obtained. Approximately 2000 pounds of this dried mixture was transferred to a still car consisting essentially of an open-top steel box, 51½ inches wide, 61½ inches long and 36 inches deep, and provided with a false bottom of perforated steel plate having 176 quarter-inch holes, spaced on 4 inch centers so as to obtain an even distribution of steam over the transverse section of the car. Beneath this false bottom, sparger pipes were provided for introducing the steam.

In this operation, the still car was filled to within 6 to 12 inches from its top with the dried fibrous mixture and the loaded car was rolled into a still chamber, consisting essentially of a strong steel enclosure, well insulated against heat loss, equipped with doors adapted to permit the entry of the still car and to be tightly closed and provided with exhausting apparatus adapted to maintain a low subatmospheric pressure therein.

With the still car in position and the still chamber closed, the pressure in the chamber was reduced and superheated steam was introduced through the sparger pipes beneath the false bottom of the still car and passed up through the bed of the dried impregnated absorbent, gradually heating said material to the temperature at which the glycerine was vaporized. Vapors rising from the surface of the bed of material in the still car were led off from the still to a series of two condensers. The first of these condensers was maintained at a temperature such that the glycerol vapors were condensed therein, but most of the water vapor would pass therethrough uncondensed. The second condenser was run cold so as to condense the remaining water vapor and any residual glycerine escaping condensation in the first condenser.

In the foregoing operation, the still chamber was maintained at a subatmospheric pressure equivalent to about 100 mm. of mercury. The superheated steam was introduced at a temperature of 260° to 285° C. and passed upwardly through the permeable mass in the car at a rate of approximately 2300 pounds of steam per hour until the vapors leaving the still chamber reached a temperature of about 200° to 210° C., indicating that substantially all of the glycerine present in the bed of material in the still car had been distilled off. This required approximately 3½ hours.

The superheated steam was then shut off and the still car and contents thereof were cooled to about 150° C. by passing saturated steam therethrough. The still car and contents were then removed from the still and a freshly charged car substituted. The contents from the still car from which the glycerol had been exhausted was then discharged into a pit and further cooled by spraying with water. The crude glycerol collected from the first condenser and the sweet waters from the second condenser were separately pumped to storage and subsequently treated for the recovery of glycerol therefrom. By this procedure, approximately 95% of the glycerol initially present in the fermentation residue was recovered.

*Example II*

In further representative large scale operations, 971 pounds of evaporated glycerol residue from the fermentation of black strap molasses and containing 10.8% glycerol by weight, is thoroughly mixed with 360 pounds of crushed peanut hulls and the mixture dried by blowing air therethrough at a temperature of 80° C. for a period of 2 to 3 hours. By this procedure, there is obtained a mass of somewhat tacky, impregnated fibrous material weighing approximately 1190 pounds.

This dried mass is transferred to the still car described in the preceding example, the car placed in the still chamber and the chamber evacuated to an absolute pressure of about 100 mm. of mercury. Superheated steam at a temperature of 250° to 260° C. is then passed through the material, as in the preceding example, at a rate of 2000 pounds to 2400 pounds per hour for a period of about three hours, at which time the temperature of the effluent vapors has risen to about 180° C.

The effluent vapors from the still are condensed as previously described, and there is recovered a yield of glycerol equivalent to 85-90% of that initially present in the residue.

Other aspects of the invention will be illustrated by the following examples which represent embodiments thereof on a smaller, experimental scale.

*Example III*

One-third of a 240 gram sample of concentrated residue obtained by the fermentation of molasses and containing 24.18% of glycerol, 45.83% of water and 29.99% of non-glycerol, non-volatile solids was mixed with 20 grams of a coarse, fibrous, air dried peat moss. After drying at a temperature of 60° C., a second one-third portion of the concentrated residue was mixed with the dried material and the resultant mixture again dried as before. The remainder of the sample was then added and mixed with the absorbent and the resultant mixture again dried as previously described.

From this procedure there was obtained 155 grams of permeable impregnated fibrous material containing 2.67% of water, 38.18% of glycerol, 13.16% of peat moss, and 45.99% non-glycerol, non-volatile solid. 122 grams of the dried mass was then distilled at an absolute pressure of 20 mm. of mercury by passing superheated steam therethrough while contained in a receptacle placed in an oil bath held at a temperature of 220° to 240° C. In this way, 51.84 grams of distillate containing 80% of glycerol, 10% water and 10% of non-glycerol material was obtained, the glycerol recovered amounting to 91% of that initially contained in the fermentation residue. The residue remaining in the still after the distillation was dry and easily handled and broken up and was found to be suitable for use as a fertilizer, since it contained commercially valuable concentrations of potash and nitrogen.

*Example IV*

100 grams of the residue used in the preceding example, was mixed in three separate increments with 33.3 grams of cottonseed hulls with intermediate and final drying, as described in the preceding example, and there was obtained therefrom 85 grams of a permeable, fibrous mass, containing 3.4% of water. This material was distilled, as in the preceding example, resulting in 26.59 grams of glycerol of 80.07% purity, equivalent to 21.29 grams of pure glycerol, representing 88.05% of the glycerol initially present in the fermentation concentrate. The residue remaining in the still after distillation was relatively dry, non-sticky and readily removable from the still. This residue contained valuable concentrations of protein and carbohydrate and was suitable for use as cattle feed.

*Example V*

80 grams of the fermentation residue used in Example III was mixed in three separate increments with 20 grams of ground peanut hulls with intermediate and final drying, as previously described, the final drying being at a temperature of 60° C. This resulted in 68 grams of a relatively dry, permeable, fibrous mass, having a moisture content of 4.5%. 58 grams of this dried material was distilled, as described in Example III, and there was thus recovered 20.13 grams of glycerol of 78% purity, which was equivalent to 95.15% of the glycerol initially present in the residue. The residue remaining in the still, after the distillation, amounting to 33 grams, was a relatively dry, fibrous material and was readily removable from the still.

Though the preceding examples specifically illustrate the invention as applied to concentrated fermentation residues from molasses, it will be understood that the invention is applicable to concentrated, glycerol-containing, fermentation residues derived from any source. For instance, the invention is applicable to the recovery of glycerol from glycerol-containing residues obtained by the fermentation of pure sugar, syrups, grain mashes and the like. The invention is, however, especially useful in the recovery of glycerol from fermentation residues derived from molasses which has heretofore been impractical due to the viscous nature of such residues and their tendency to form tars when subjected to steam distillation under vacuum by conventional procedure.

My present invention provides a method by which the mass to be distilled may be easily handled in charging it to the still and the residue remaining in the still following the distillation may be readily removed from the still, broken up and disposed of as previously suggested. By using an organic fibrous material, such as previously described, the residue from the still is especially valuable as fertilizer, or animal feed.

Because of general difficulties in maintaining the still under the desired degree of vacuum during intermittent or continuous charge of the fibrous mass to the still, it is presently preferred to operate the process batchwise. It will be understood, however, that the invention in its broader aspect also contemplates a continuous system of distillation by passing the superheated steam through a moving bed of the fibrous material to which fresh material is continuously, or intermittently added and material from which the glycerol has been extracted is continuously or intermittently removed, and the continuous method of operation is recommended where suitable equipment for maintaining the desired vacuum is available.

I have found it particularly advantageous to maintain the still at a vacuum equivalent to 100 mm. of mercury. However, advantageous results are obtained where somewhat higher pressures are used, say within the range of 100 to 200 mm. of mercury.

Where the mixture is air dried, prior to distillation, temperatures within the range of 80 to 85° C. have been used advantageously. Where too high temperatures are used in air drying, there is a danger of burning the mass and decomposing, or otherwise losing glycerine. It is desirable that the fibrous material be substantially dehydrated prior to mixing with the fermentation residue since, under such conditions, the residue is more readily absorbed thereby. However, the predrying of the fibrous material is usually unnecessary.

The temperature at which the superheated steam is supplied to the still is also subject to some variation. In general, it is advantageous that the steam be at a temperature within the range of about 240° to 270° C. Steam at lower temperatures may be used, for instance, at about 220° C. However, where lower temperature steam is used, the percentage yield of glycerine is apt to be lower.

This application is in part a continuation of my copending application Serial No. 657,340 filed March 26, 1946.

I claim:

1. Process for the recovery of glycerol from a concentrated, glycerine-containing, fermentation residue which comprises mixing the residue with a shreddy, vegetable fibrous absorbent material in proportions such that all of the residue added will be taken up by and adhere to the absorbent, drying the resultant mass to drive off residual water therefrom, thereafter distilling the glycerol from the dried mass by passing superheated steam through a bed of the dried material of substantial thickness enclosed in a distilling chamber maintained under subatmospheric pressure, withdrawing admixed steam and glycerol vapors from the chamber and recovering the glycerol from the mixed vapors.

2. The process of claim 1 in which the distilling chamber is maintained at absolute pressure within the range of 100 to 200 mm. of mercury.

3. The process of claim 1 in which the superheated steam is supplied at a temperature of 240° to 270° C.

4. The process of claim 1 in which the solid absorbent material is crushed peanut hulls.

5. The process of claim 4 in which the weight ratio of the evaporated residue to crushed peanut hulls is in the range of 2:1 to 3:1.

6. The process of claim 1 in which the bed of impregnated absorbent in the distilling chamber is from 1 to 3 feet thick.

7. The process of claim 1 in which the impregnated mass is dried by passing heated air therethrough.

8. The process of claim 1 in which the drying of the impregnated material is effected by blowing air therethrough at a temperature of about 80° to 85° C.

9. The process of claim 1 in which the drying of the impregnated mass is effected by heating under subatmospheric pressure.

10. The process of claim 1 in which the solid absorbent material is substantially free from fines.

HOWARD M. HODGE.

REFERENCES CITED

The following references are of record in the file of this patent:

UNITED STATES PATENTS

| Number | Name | Date |
|---|---|---|
| 1,193,951 | Laszloffy | Aug. 8, 1916 |
| 2,153,704 | Werner | Apr. 11, 1939 |

FOREIGN PATENTS

| Number | Country | Date |
|---|---|---|
| 110,416 | Australia | May 30, 1940 |